United States Patent [19]

Howard

[11] 4,345,657
[45] Aug. 24, 1982

[54] ELECTRONIC DEPTH INDICATOR FOR HYDRAULIC DRILLING MACHINES

[75] Inventor: Mig A. Howard, Houston, Tex.

[73] Assignee: Hughes Tool Company, Houston, Tex.

[21] Appl. No.: 81,726

[22] Filed: Oct. 4, 1979

[51] Int. Cl.³ .............................................. E21B 47/04
[52] U.S. Cl. ........................................ 175/40; 73/632; 367/108
[58] Field of Search .................. 340/860, 861; 175/40, 175/50; 73/627, 632, 290 V, 290 R; 367/107, 108, 112

[56] References Cited

U.S. PATENT DOCUMENTS

| | | | |
|---|---|---|---|
| 825,857 | 7/1906 | Moran et al. | 175/203 |
| 2,137,985 | 11/1938 | Salvatori | 181/0.5 |
| 2,769,158 | 10/1956 | Schultz | 73/627 |
| 3,174,127 | 3/1965 | Haslett | 340/3 |
| 3,208,281 | 9/1965 | Kalmus et al. | 73/290 V |
| 3,394,585 | 7/1968 | Davey | 73/627 |
| 3,881,168 | 4/1975 | Farr et al. | 340/15.5 |
| 3,906,434 | 9/1975 | Lamel et al. | 340/18 |
| 3,938,371 | 2/1976 | Dini | 73/67.8 |
| 3,962,674 | 6/1976 | Howell | 340/15.5 |
| 3,971,449 | 7/1976 | Nylund et al. | 175/203 |
| 4,114,457 | 9/1978 | Thun | 73/632 |
| 4,281,404 | 7/1981 | Morrow et al. | 367/108 |

Primary Examiner—James A. Leppink
Attorney, Agent, or Firm—Robert A. Felsman

[57] ABSTRACT

A depth determining device has features for informing the operator of the depth of the cutting tool of a hydraulic drilling machine. The drilling machine is for earth boreing and has a piston carried in a cylinder and secured to a driven kelly. The device has a transducer mounted at the top of the cylinder for transmitting a sound wave through hydraulic fluid to the tap of the piston and detecting the return of the wave at the top of the cylinder. A counter determines the elapsed time for the sound travel. The elapsed time is converted into depth and displayed.

6 Claims, 2 Drawing Figures

ELECTRONIC DEPTH INDICATOR FOR HYDRAULIC DRILLING MACHINES

CROSS-REFERENCE TO RELATED APPLICATION

This application is related in the overall result achieved to the application of Thomas F. Cole, "Hydraulic Depth Indicator for Hydraulic Drilling Machines", Ser. No. 100,597, filed Dec. 5, 1979. This application is also assigned to the assignee of the present application, Hughes Tool Company of Houston, Tex.

BACKGROUND OF THE INVENTION

1. Field of the Invention

This invention relates in general to a device for indicating the depth of a hole drilled by an earth boring machine, particularly of the type utilizing a hydraulic cylinder for raising and lowering the cutting tool.

2. Description of the Prior Art

One type of machine for drilling holes for foundations, utility poles, and the like, utilizes a hydraulic cylinder for moving an auger in and out of the hole. A piston is located in the cylinder and connected to a kelly for moving the kelly longitudinally in response to hydraulic fluid pressure. An auger or other type of cutting tool is connected to the bottom of the kelly, which is rotatably driven.

Because the top of the kelly is enclosed in the cylinder, the operator is unable to determine the depth of the hole by looking at the top of the kelly. It is advantageous to know hole depth during drilling. Also, the operator has to pull the auger from the hole for every two foot or so drilled in order to spin the spoil from the auger. When returning the auger to the bottom, the auger might strike the bottom of the hole too quickly, causing damage to the machine.

SUMMARY OF THE INVENTION

It is accordingly a general object in this invention to provide a hole depth determining device for a hydraulic drilling machine.

It is a further object of this invention to provide an electronic hole depth determining device for a hydraulic drilling machine.

It is a further object of this invention to provide an electronic hole depth determining device for a hydraulic drilling machine with the capability of warning the operator when the cutting tool is nearing bottom when returning for further drilling.

In accordance with these objects, an electronic device is provided for use with a hydraulic drilling machine to determine hole depth. The device includes a transducer mounted to the top of the hydraulic cylinder for providing a pulsed ultrasonic wave that travels through the hydraulic fluid in the cylinder. The wave strikes the piston and is reflected back to the transducer, where an electrical signal is produced. A counter for counting the cycles of an oscillator is initiated when the sound wave is transmitted, and stopped when the wave returns to the transducer. The cycles counted represent the distance from the transducer to the top of the piston.

A zero set circuit records the time for the sound wave to travel to the piston and back when the auger is at ground level. This reference number is subtracted from the total lapsed time measured and displayed on a readout device. An approach alarm circuit records the total depth drilled and warns the operator when he is approaching bottom when returning the auger for further drilling.

BRIEF DESCRIPTION OF THE DRAWINGS

FIG. 1b is the remaining portion of the diagram of FIG. 1a.

DESCRIPTION OF THE PREFERRED EMBODIMENT

Figure 1A:
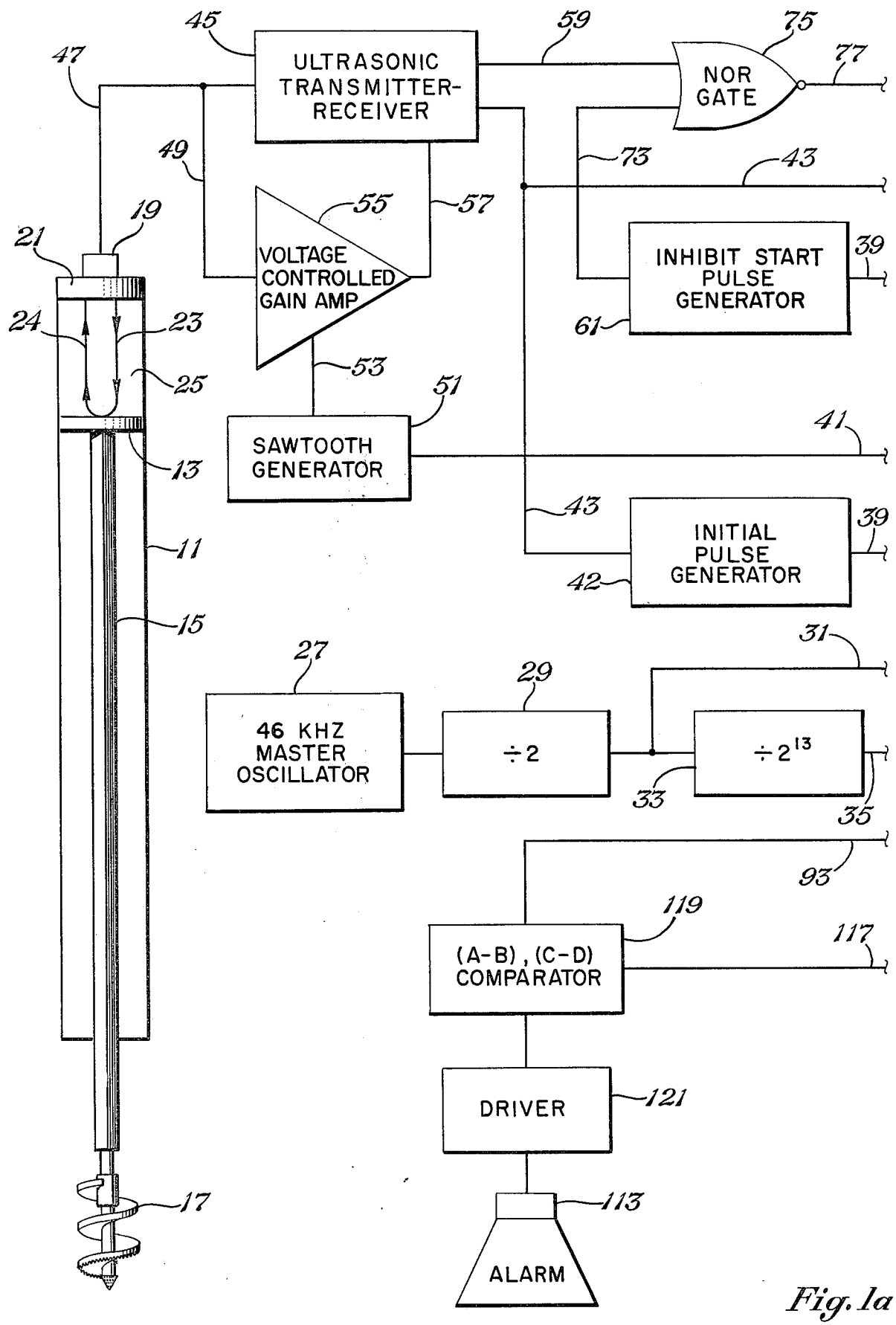
FIG. 1a is a portion of a schematic diagram illustrating a depth determining device constructed in accordance with this invention.
Figure 1B:
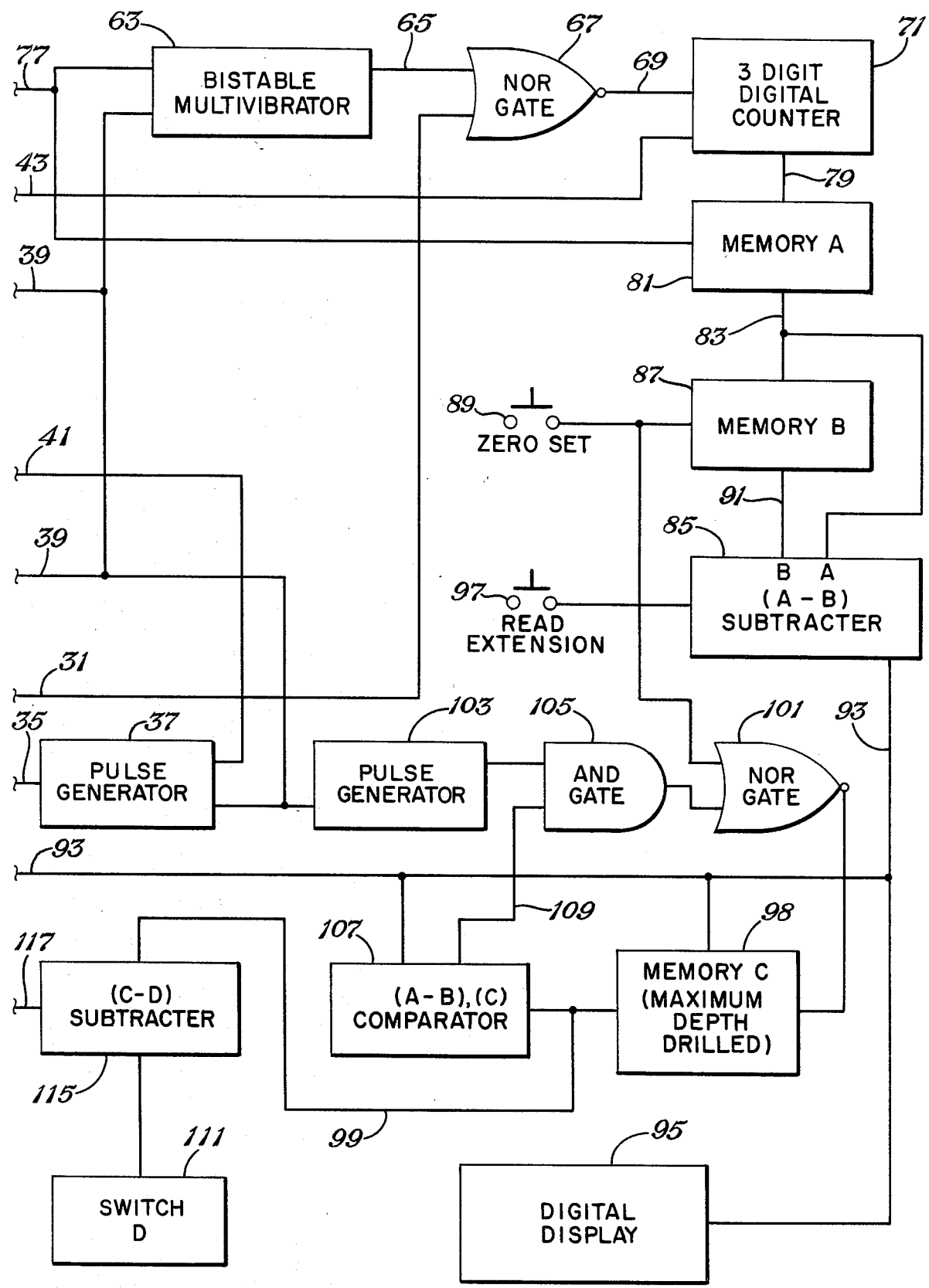

The earth boring machine is normally mounted on a vehicle and includes a cylinder 11. A piston 13 is slidably carried in the cylinder 11. Pressurized hydraulic fluid is supplied to the cylinder selectively above and below the piston 13 to move the piston along the longitudinal axis of cylinder 11. A kelly 15 is carried by piston 13 through bearings that allow the kelly to rotate with respect to the cylinder 11 and piston 13. Kelly 15 is a rectangular bar and extends sealingly through the bottom of cylinder 11. A cutting tool such as an auger 17 is adapted to be secured to the bottom of kelly 15. Rotation means (not shown) rotates kelly 15 with respect to cylinder 11 for drilling.

An ultrasonic piezoelectric transducer 19 with a frequency of 200 $KH_z$ (200,000 cycles per second) is mounted to the top of end cap 21 of cylinder 11.

Through suitable electronic circuits, a pulsed, longitudinal, ultrasonic sound wave 23 travels through the hydraulic fluid 25 and is reflected off the piston 13. A reflected sound wave 24 returns to the transducer 19, which converts the detection to an electrical signal. Electronic circuits convert the elapsed time required for the round trip of the sound wave 23,24 to the depth drilled.

The electronic circuity is counted in a control box at the drilling machine. A master oscillator 27 that generates a stable frequency of about 46 $KH_z$ is included. A first divider circuit 29 divides the 46 $KH_z$ signal by two. This produces a 23 $KH_z$ clock signal on its output line 31. A second divider circuit 33 divides the 23 $KH_z$ signal by 8192 ($2^{13}$). This produces a 2.8 $H_z$ square wave on its output line 35. A first pulse generator means 37 converts the square wave on line 35 to a 10 microsecond pulse on one of its outputs, line 39. This pulse has a 2.8 $H_z$ repetition rate. On the other output of pulse generator 37, line 41, an inverse pulse is generated. The 10 microsecond pulse on the first output line 39 triggers an initial pulse generator 42. This produces a 180 microsecond pulse on its output line 43. This turns on the transmitter part of ultrasonic transmitter-receiver 45 for 180 microseconds at a repetition rate of 2.8 $H_z$. An electrical transmit pulse signal is generated by the transmitter means on line 47 which drives the ultrasonic transducer 19. The transducer oscillates at 200 $KH_z$ for 180 microseconds. This produces an ultrasonic sound wave 23 of the same frequency and duration. The sound wave 23 travels through the hydraulic fluid 25 and is reflected off of the piston 13. The return sound wave 24 causes the transducer 19 to produce an electrical signal on the receiver line 47.

Because oil is not one of the better carriers of ultrasound, a distance corrected gain circuit means is included in the receiver amplifier circuit. An electronic circuit is used to increase the receiver gain as the sound path becomes greater. The first pulse generator 37 produces a 10 microsecond pulse on its output line 41 that enables the sawtooth generator means 51. Its output is a voltage ramp on line 53. The ramp starts at the beginning of the transmit pulse on line 47. It continues for a time equal to the ultrasonic sound path time and reaches a maximum when kelly 15 is extended 15 feet. The sawtooth generator ramp maintains this maximum after 15 feet. The ramp voltage increases the gain of a voltage controlled gain amplifier means 55 as the sound path distance increases. The electrical return signal on line 49 is thus amplified and the gain increases with the depth. The amplified signal on line 57 is applied to the receiver portion means of the ultrasonic transmitter-receiver 45. A stop pulse signal on line 59 is produced by the receiver part of the transmitter-receiver 45 with the return signal on line 57.

The 10 microsecond pulse on line 39 on the first output of the first pulse generator 37 activates the initial pulse generator 42. It also triggers an inhibit start pulse generator circuit 61 and sets the output line 65 of the bistable multivibrator 63 low. This allows the 23 $KH_z$ clock signal on line 31 to pass through a NOR gate 67 to its output on line 69. Simultaneously, the output on line 43 from the initial pulse generator 42 sets a three digit digital counter 71 to zero. Counter 71 then starts counting each cycle of the 23 $KH_z$ clock signal on line 31. The inhibit start pulse generator 61 produces a pulse on line 73 slightly wider than the initial pulse generator 42 pulse on line 43. This pulse on line 73 is applied to one input of the NOR gate 75 and inhibits the gate during this period. This insures that the counter 71 is not stopped during the transmit portion of the cycle.

When the return sound wave 24 strikes the transducer 19, an electrical signal is produced on line 47. This signal on line 47 generates the stop pulse on line 59. The stop pulse on line 59 is applied to the second input of the NOR gate 75. This produces a stop signal on line 77 on the output of the NOR gate 75. This triggers the bistable multivibrator 63 and sets its output on line 65 high. The next NOR gate 67 is inhibited. This stops the 23 $KH_z$ clock signal on line 31 from passing to the digital counter 71.

The velocity of sound in hydraulic oil or fluid 25 is approximately 4600 feet per second. For a kelly 15 extension distance of 10 feet, the sound path is 20 feet. This gives a time of 20 feet divided by 4600 feet per second or 1/230 of a second. With a clock frequency on line 31 of 23 $KH_z$, 100 pulses will be counted during this period. This represents 10.0 feet.

The accumulated digital total of the digital counter 71 is presented at the digital counter output on line 79 and a memory A circuit 81 input line 79. The stop pulse line 77 loads the digital counter data output on line 79 into memory means A 81 and onto memory A output on line 83. This feeds the inputs to memory means B 87 and the (A−B) subtracter means 85.

The operator normally wants to know the depth drilled from the surface of the ground. This is accomplished by the (A−B) subtracter logic circuit 85, which is preset at the beginning of the drilling. The auger 17 is lowered to the ground. The kelly bar 15 extension distance is then presented in digital form at the input of memory circuit B 87 and (A−B) subtracter circuit 85. Pushing the zero set pushbutton 89 loads the digital data at memory A 81 output line 83 into memory B 87 and onto its output line 91. This reference data represents the sound wave travel time when the auger 17 is at ground level. The same data is presented at input line 83 and input line 91 of the (A−B) subtracter 85. Subtracting memory B circuit 87 data from memory A circuit 81 data in the (A−B) subtracter 85 yields zero on the (A−B) subtracter 85 output line 93. This data is then displayed on the digital display means 95. It is zero. If the total extension of the kelly bar 15 is desired, pushing the read extension pushbutton 97 disables the (A−B) subtracter 85 and transfers the data held in memory A 81 to the digital display 95. This does not destroy the ground reference data held in memory B 87. When the read extension pushbutton 97 is released, the original data will again be displayed. As the auger 17 digs into the ground, the data in memory A 81 will be updated 2.8 times per second. The data stored in memory B 87 will not change. The difference between the data in memory A 81 and memory B 87 will be the actual current depth of auger 17 with respect to the surface as a datum. This is continuously displayed at display 95.

As the auger 17 fills with spoil, it is necessary to come out of the hole and spin the spoil from the auger 17. As the auger 17 re-enters the hole, the operator needs to know when he approaches the bottom of the hole. This is so he can slow the rate of travel of the auger 17 and prevent damage to the auger 17 and other equipment. This is accomplished by approach alarm circuit means. The current auger depth digital data on line 93 is applied to memory means C 98, the maximum depth drilled memory. Pushing the zero set pushbutton 89 loads the zero depth drilled data into the memory C 98 and, consequently, onto its output line 99. Thus the maximum depth drilled recorded in memory circuit C 98 is set to zero at ground level.

As the auger 17 digs into the ground, the current auger depth is presented to memory C 98 input line 93. Current auger depth data on line 93 is also presented to an (A−B), (C) comparator means 107. A second pulse generator 103 produces a 10 microsecond pulse that is transferred through an AND gate 105 and a NOR gate 101. This loads the current auger depth data on line 93 into the maximum depth drilled memory C 98 and onto its output line 99. The data is loaded prior to the updating of data from memory A 81 on its output line 83. When the current auger depth data on line 93 is updated, the (A−B), (C) comparator 107 compares the maximum depth drilled data on line 99 to current auger depth data on line 93. If the maximum depth drilled data on line 99 is less than the current auger depth data on line 93, the (A−B), (C) comparator 107 is high. This allows an additional data load pulse from the pulse generator 103 to transfer the current auger depth data on line 93 to the memory C 98 and to line 99. If, however, the maximum depth drilled data on line 99 is greater than or equal to the current auger depth data on line 93, the output line 109 of the (A−B), (C) comparator goes low and inhibits the AND gate 105. No further data can be loaded into maximum depth drilled memory C 98 until a deeper depth is reached. Thus, memory C 98 serves as memory means for storing only the maximum depth drilled data.

The approach, alarm switch D 111 allows the operator to preselect any distance between zero and nine feet for triggering an alarm means 113. Therefore, if the distance three feet is selected, the alarm will sound when the auger 17 is within three feet of the bottom of the hole. Switch means D 111 produces a digital code that is subtracted from the maximum depth drilled data on line 99 in the (C−D) subtracter circuit 115. The output of the (C−D) subtracter circuit on line 117 is compared to the current auger depth data on line 93 in a (A−B), (C−D) comparator means 119. As long as the auger 17 is further away from the bottom of the hole than the distance preselected, no output will be available to an alarm driver 121. When the auger 17 reaches the preselected distance, the alarm driver 121 will be activated. This initiates a two second audible signal in the alarm means 113.

In operation, when commencing to drill a hole, the operator lowers auger 17 to ground and pushes zero set button 89. Initial pulse generator 42 causes the transmitter-receiver 45 to provide a sound wave 23 that strikes piston 13. At the initiation of sound wave 23, counter 71 is initiated by the same electrical initiating pulse on line 43 that initiated the sound pulse. Counter 71 will count the cycles of the 23 KHz signal provided to it through line 31. The returning sound wave 24 causes an electrical output on line 59 that stops the counter 71. The number of cycles counted are transferred to memory A 81. The depression of zero set button 89 allows memory B 87 to record this data, indicating the distance from transducer 19 to piston 13 when the auger is at ground level.

As the drilling is commenced, sound pulses are generated and the distance updated 2.8 times per second. Piston 13 will move further from transducer 19 during drilling. The (A−B) subtracter 85 will subtract the preset reference data in memory B 87 from memory A 81, and display this on digital display 95 as the current auger depth below the surface. This data is also loaded into memory C 98.

When withdrawing the auger 17 from the hole to spin spoil, memory C 98 will be disabled by (A−B), (C) comparator 107 from receiving the data on line 93. The (A−B), (C) comparator 107 inhibits AND gate 105 when the data on line 99 is greater than that of line 93. Consequently, memory C 98 will store the maximum hole depth.

When returning into the hole, the (A−B), (C−D) comparator 119 will compare the data on line 93 to the (C−D) subtracter 115 output on line 117. This output represents the maximum depth drilled less a selected number of feet provided by switch D 111. Once the data on line 93 equals that on line 117, the audible alarm 113 will sound, warning the operator that the auger 17 is nearing bottom.

The ultrasonic transducer 19, transmitter-receiver 45, and pulse generators 42 and 37 serve as transducer means for transmitting a sound wave and detecting its return. Counter 71, NOR gates 67 and 75, bistable multivibrator 63, inhibit start pulse generator 61 and oscillator 27 serve as counter means for determining the elapsed time for the wave to travel to the piston and be reflected back to the transducer 19. Zero set button 89, memory B 87, and the (A−B) subtracter 85 serve as zero set means for subtracting from the elapsed time a reference time that it takes for a wave to travel from the transducer to the piston and back when the auger is located at the surface of the earth.

Pulse generator 103, AND gate 105, NOR gate 101, memory C 98, the (A−B), (C) comparator 107, the (C−D) subtracter 115, switch D 111, the (A−B), (C−D) comparator 119, driver 121 and alarm 113 serve as approach alarm means for providing a signal to the operator when the cutting tool is within a selected distance of the bottom of the hole, when returning the cutting tool for further drilling. AND gate 105, NOR gate 101, and second pulse generator 103 serve as enabling means for enabling memory C 98 only if the (A−B) comparator 107 determines that the data output of memory C 98 is less than the data output of (A−B) subtracter 85.

It should be apparent that an invention having significant improvements has been provided. The electronic device described provides continuing indication of the hole depth. It also warns the operator when the auger is nearing bottom when returning for further drilling.

While the invention has only been shown in one of its forms, it should be apparent to those skilled in the art that it is not so limited but is susceptible to various changes and modifications without departing from the spirit thereof.

I claim:

1. A depth determining apparatus for an earth boring machine of the type having a cylinder, a piston carried in the cylinder and longitudinally movable in response to hydraulic fluid pressure, a rotatably driven kelly carried by the piston and adapted to carry a cutting tool, the apparatus comprising:

transducer means mounted at the top of the cylinder for transmitting a sound wave through the hydraulic fluid to the top of the piston and detecting the return of the wave at the top of the cylinder;

counter means for determining the elapsed time for the wave to travel to the piston and back to the transducer means; and display means for converting the elapsed time into a signal corresponding to the depth of the cutting tool and displaying the signal to the operator.

2. A depth determining apparatus for an earth boring machine of the type having a cylinder, a piston slidably carried in the cylinder and longitudinally movable in response to hydraulic fluid pressure, a rotatably driven kelly carried rotatably by the piston, and adapted to carry a cutting tool, the apparatus comprising:

transducer means mounted at the top of the cylinder for transmitting a sound wave through the hydraulic fluid to the top of the piston and detecting the return of the wave at the top of the cylinder;

counter means for determining the elapsed time for the wave to travel to the piston and back to the transducer means;

zero set means for subtracting from the elapsed time a reference time that it takes for a wave to travel from the transducer means to the piston and back when the cutting tool is located at the surface; and display means for converting the difference between the elapsed time and the reference time into a signal corresponding to the distance from the surface to the bottom of the cutting tool and displaying the signal to the operator.

3. A depth determining apparatus for an earth boring machine of the type having a cylinder, a piston slidably carried in the cylinder and longitudinally movable in response to hydraulic fluid pressure, a rotatably driven kelly having its upper end rotatably mounted to the bottom of the piston, its lower end adapted to carry a cutting tool, the apparatus comprising:

transducer means mounted at the top of the cylinder for transmitting a sound wave through the hydraulic fluid at the top of the piston and detecting the return of the wave at the top of the cylinder;

counter means for determining the elapsed time for the wave to travel to the piston and back to the transducer means;

zero set means for subtracting from the elapsed time a reference time that it takes for a wave to travel from the transducer means to the piston and back when the cutting tool is located at the surface;

display means for converting the difference between the elapsed time and the reference time into a signal corresponding to the distance from the surface to the bottom of the cutting tool and displaying the signal to the operator; and means for recording the total depth drilled and providing a signal to the operator when the cutting tool is being lowered back into the hole.

4. A depth determining apparatus for an earth boring machine of the type having a cylinder, a piston slidably carried in the cylinder and longitudinally movable in response to hydraulic fluid pressure, a rotatably driven kelly having its upper end rotatably mounted to the bottom of the piston, its lower end adapted to carry a cutting tool, the apparatus comprising:

transducer means carried at the top of the cylinder for transmitting a sound wave through the hydraulic fluid to the top of the piston and detecting the return of the wave at the top of the cylinder;

counter means for determining the elapsed time for the wave to travel to the piston and back to the transducer means;

first memory means for recording the time counted by the counter means during the wave travel elapsed time and for providing a data output in response thereto;

second memory means for recording the time counted by the counter means during a reference time for the wave to travel to the piston and be reflected to the receiver means when the cutting tool is positioned at the surface of the earth and for providing a data output in response thereto;

display means for subtracting the data output of the first memory means from the data output of the second memory means and for displaying the difference as the depth of the cutting tool with respect to the surface.

5. A depth determining apparatus for an earth boring machine of the type having a cylinder, a piston carried in the cylinder and longitudinally movable in response to hydraulic fluid pressure, a rotatably driven kelly having its upper end rotatably mounted to the bottom of the piston, its lower end adapted to carry an earth cutting tool, the apparatus comprising:

transducer means carried at the top of the cylinder for sending a sound wave through the hydraulic fluid to the top of the piston and detecting the return of the wave at the top of the cylinder;

counter means for determining the elapsed time for the wave to travel to the piston and back to the transducer means;

first memory means for recording the time counted by the counter means during the wave travel elapsed time and for yielding a data output in response thereto;

second memory means for recording the time counted by the counter means during a reference time for a wave to travel to the piston and back to the transducer means when the cutting tool is positioned at surface and for yielding a data output in response thereto;

display means for subtracting the data output of the first memory means from the data output of the second memory means and for displaying the difference as the current cutting tool depth with respect to the surface;

third memory means for recording only the time counted by the counter means proportional to the maximum depth drilled and for providing a data output in response thereto; and alarm means for providing a warning signal should the current cutting tool depth be less than the maximum depth drilled recorded by the third memory means by a preselected amount, to indicate that the operator is nearing bottom when lowering the tool for further drilling.

6. A depth determining apparatus for an earth boring machine of the type having a cylinder, a piston carried in the cylinder and longitudinally movable in response to hydraulic fluid pressure, a rotatably driven kelly having its upper end rotatably mounted to the bottom of the piston, its lower end adapted to carry an earth cutting tool, the apparatus comprising:

transducer means carried at the top of the cylinder for transmitting a sound wave through the hydraulic fluid to the top of the piston and detecting the return of the wave at the top of the cylinder;

counter means for counting the cycles generated by an oscillator during the elapsed time for the wave to travel to the piston and back to the transducer means;

first memory means for recording the total cycles counted by the counter means during the wave travel elapsed time and for yielding a data output in response thereto;

second memory means for recording the total cycles counted by the counter means during a reference time for the wave to travel to the piston and back to the transducer means when the cutting tool is positioned at the surface and for yielding a data output in response thereto;

display means for subtracting the data output of the first memory means from the data output of the second memory means and for displaying the difference as the current cutting tool depth with respect to the surface, the oscillator being driven at a rate selected to correlate the total cycles counted by the counter means to the speed of sound through the hydraulic fluid;

third memory means for recording the current cutting tool depth and for providing a data output in response thereto;

enabling means for enabling the third memory means to record the current cutting tool depth only if the current cutting tool depth is greater than the previous recorded maximum cutting tool depth;

switch means for providing a data output proportional to the number of cycles counted by the counter means for a selected wave travel distance to select the amount of approach warning desired;

alarm means for providing a warning signal when the current cutting tool depth reaches a distance equal to the maximum cutting tool depth recorded by the third memory means less the distance selected by the switch means.

* * * * *